(12) United States Patent
Heeter et al.

(10) Patent No.: US 12,066,035 B1
(45) Date of Patent: Aug. 20, 2024

(54) ADJUSTABLE DEPTH TIP TREATMENT WITH AXIAL MEMBER WITH POCKETS FOR A FAN OF A GAS TURBINE ENGINE

(71) Applicants: Rolls-Royce North American Technologies Inc., Indianapolis, IN (US); Rolls-Royce Corporation, Indianapolis, IN (US)

(72) Inventors: Robert W. Heeter, Indianapolis, IN (US); Daniel E. Molnar, Jr., Indianapolis, IN (US); Michael S. Krautheim, Indianapolis, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/234,663

(22) Filed: Aug. 16, 2023

(51) Int. Cl.
| | |
|---|---|
| *F02K 3/06* | (2006.01) |
| *F04D 29/52* | (2006.01) |
| *F04D 29/54* | (2006.01) |
| *F04D 29/56* | (2006.01) |
| *F04D 29/68* | (2006.01) |

(52) U.S. Cl.
CPC .............. *F04D 29/563* (2013.01); *F02K 3/06* (2013.01); *F04D 29/526* (2013.01); *F04D 29/542* (2013.01); *F04D 29/68* (2013.01); *F05D 2220/36* (2013.01); *F05D 2240/12* (2013.01); *F05D 2240/14* (2013.01)

(58) Field of Classification Search
CPC ...... F04D 29/542; F04D 29/526; F04D 29/68; F04D 29/563; F02K 3/06; F05D 2220/36; F05D 2240/12; F05D 2240/14
See application file for complete search history.

(56) References Cited

U.S. PATENT DOCUMENTS

| | | | |
|---|---|---|---|
| 4,086,022 A | 4/1978 | Freeman et al. | |
| 5,137,419 A | 8/1992 | Waterman | |
| 5,282,718 A * | 2/1994 | Koff ...................... | F04D 29/685 |
| | | | 415/58.7 |
| 5,607,284 A * | 3/1997 | Byrne ................... | F04D 29/526 |
| | | | 415/58.7 |
| 5,762,470 A | 6/1998 | Gelmedov et al. | |
| 6,231,301 B1 | 5/2001 | Barnett et al. | |
| 6,409,470 B2 | 6/2002 | Allford et al. | |
| 6,497,551 B1 | 12/2002 | Hand et al. | |
| 6,514,039 B1 | 2/2003 | Hand | |
| 6,619,909 B2 | 9/2003 | Barnett et al. | |
| 6,648,591 B2 | 11/2003 | Collins | |

(Continued)

FOREIGN PATENT DOCUMENTS

| | | |
|---|---|---|
| CN | 113217469 A | 8/2021 |
| DE | 102007056953 | 10/2015 |

(Continued)

*Primary Examiner* — David E Sosnowski
*Assistant Examiner* — Theodore C Ribadeneyra
(74) *Attorney, Agent, or Firm* — Barnes & Thornburg LLP (57) ABSTRACT

A fan case assembly adapted for use with a gas turbine engine includes a case at extends circumferentially at least partway about an axis of the gas turbine engine and a plurality of vanes. The case is formed to define a channel that that extends circumferentially at least partway about the axis. The plurality of vanes are arranged in the channel and spaced apart circumferentially about the axis.

20 Claims, 6 Drawing Sheets

(56) References Cited

U.S. PATENT DOCUMENTS

| | | |
|---|---|---|
| 6,685,426 B2 | 2/2004 | Clark |
| 6,736,594 B2 | 5/2004 | Yie et al. |
| 6,832,890 B2 | 12/2004 | Booth |
| 6,905,305 B2 | 6/2005 | James |
| 6,935,833 B2 | 8/2005 | Seitz |
| 7,186,072 B2 | 3/2007 | Seitz |
| 7,210,905 B2 | 5/2007 | Lapworth |
| 7,575,412 B2 | 8/2009 | Seitz |
| 8,257,022 B2 | 9/2012 | Guemmer |
| 8,419,355 B2 | 4/2013 | Guemmer et al. |
| 8,602,720 B2 | 12/2013 | Goswami et al. |
| 8,845,269 B2 | 9/2014 | Agneray et al. |
| 8,915,699 B2 | 12/2014 | Brignole et al. |
| 9,638,213 B2 | 5/2017 | Obrecht et al. |
| 9,651,060 B2 | 5/2017 | Morel et al. |
| 9,957,976 B2 | 5/2018 | Allford |
| 10,024,336 B2 | 7/2018 | Obrecht et al. |
| 10,047,620 B2 | 8/2018 | Giacche et al. |
| 10,378,550 B2 | 8/2019 | Lim et al. |
| 10,450,869 B2 | 10/2019 | Brignole et al. |
| 10,539,154 B2 | 1/2020 | Mallina et al. |
| 11,078,805 B2 | 8/2021 | Joly et al. |
| 11,092,030 B2 | 8/2021 | Joly et al. |
| 11,131,322 B2 | 9/2021 | Grothe et al. |
| 11,293,293 B2 * | 4/2022 | Zha ................... F04D 29/685 |
| 11,473,438 B2 | 10/2022 | Reynolds et al. |
| 11,572,897 B1 | 2/2023 | Duong et al. |
| 2007/0147989 A1 | 6/2007 | Collins |
| 2008/0044273 A1 | 2/2008 | Khalid |
| 2012/0315131 A1 | 12/2012 | Mertens |

FOREIGN PATENT DOCUMENTS

| | | |
|---|---|---|
| EP | 2434164 | 3/2012 |
| EP | 3081779 | 10/2016 |
| JP | 2003227497 A | 8/2003 |
| KR | 200930757 A | 3/2009 |

\* cited by examiner

ADJUSTABLE DEPTH TIP TREATMENT WITH AXIAL MEMBER WITH POCKETS FOR A FAN OF A GAS TURBINE ENGINE

STATEMENT REGARDING FEDERALLY SPONSORED RESEARCH OR DEVELOPMENT

Embodiments of the present disclosure were made with government support under Contract No. FA8650-19-D-2063 or FA8650-19-F-2078. The government may have certain rights.

FIELD OF THE DISCLOSURE

The present disclosure relates generally to gas turbine engines, and more specifically to fan assemblies for gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

In embedded gas turbine engine applications, the engine may experience high distortion in the form of pressure gradients and swirl. The pressure and swirl distortions may cause engine stall or other undesirable aeromechanical behavior. The fan of the gas turbine engine may include mitigation systems to reduce or minimize the negative effects of pressure and swirl distortions to improve stall margin of the engine.

SUMMARY

The present disclosure may comprise one or more of the following features and combinations thereof.

A fan case assembly may be adapted for use with a gas turbine engine. The fan case assembly may include a case, a plurality of vanes, and an inlet distortion mitigation system.

In some embodiments, the case may extend circumferentially at least partway about an axis to define an outer boundary of a gas path of the gas turbine engine. The case may be formed to define a channel that that extends circumferentially at least partway about the axis.

In some embodiments, the plurality of vanes may be arranged in the channel. The plurality of vanes may be spaced apart circumferentially about the axis to define a plurality of openings open to the gas path of the gas turbine engine.

In some embodiments, the inlet distortion mitigation system may include a movable member and a control unit. The movable member may be mounted for movement relative to the case. The movable member my be configured to axially translate relative to the case to move between a first slot position and a second slot position. In the first slot position, the movable member may cooperate with the plurality of vanes to define a first set of slots having a first slot depth. In the second slot position, the movable member may cooperate with the plurality of vanes to define a second set of slots having a second slot depth that is greater than the first slot depth.

In some embodiments, the control unit may be configured to move the movable member between the first slot position and the second slot position. The control unit may be configured to move the movable member between the first slot position and the second slot position in response to preselected operating conditions to minimize negative effects pressure and swirl distortions in the gas turbine engine to improve stall margin.

In some embodiments, the movable member may be shaped to define a first set of pockets. The first set of pockets may extend radially to a first pocket depth. The first set of pockets may align with the plurality of openings to define the first set of slots when the movable member is in the first slot position.

In some embodiments, the movable member may be shaped to define a second set of pockets spaced apart axially from the first set of pockets. The second set of pockets may extend radially to a second pocket depth. The second set of pockets may align with the plurality of openings to define the second set of slots when the movable member is in the second slot position. The second pocket depth of the second set of pockets may be greater than the first pocket depth of the first set of pockets.

In some embodiments, the movable closure may include a band and a plurality of flanges. The band may extend circumferentially at least partway about the axis. The plurality of flanges may be spaced apart circumferentially about the axis. Each flange of the plurality of flanges may extend axially from the band between adjacent vanes included in the plurality of vanes.

In some embodiments, each flange of the plurality of flanges may include a first pocket from the first set of pockets and a second pocket from the second set of pockets. The second pocket may be spaced apart axially from the first pocket.

In some embodiments, the inlet distortion mitigation system may further include a movable closure mounted for movement relative to the case. The movable closure may be configured to axially translate relative to the case to move between a closed position and an open position. In the closed position, the movable closure may cover the plurality of openings to block fluid communication between the gas path and one of the first set of pockets and the second set of pockets. In the open position, the movable closure may be spaced apart from the plurality of openings to allow fluid communication between the gas path and the one of the first set of pockets and the second set of pockets.

In some embodiments, the control unit may be configured to move the movable closure between the closed position and the open position. The control unit may be configured to move the movable closure between the closed position and the open position in response to the preselected operating conditions.

In some embodiments, the inlet distortion mitigation system may further includes a movable closure mounted for movement relative to the case and configured to axially translate relative to the case to move between a closed position and an open position. In the closed position, the movable closure may cover the plurality of openings to block fluid communication between the gas path and one of the first set of slots and the second set of slots. In the open position, the movable closure may be spaced apart from the plurality of openings to allow fluid communication between the gas path and the one of the first set of slots and the second set of slots. The control unit may be configured to move the movable closure between the closed position and the open position in response to the preselected operating conditions.

In some embodiments, the control unit may include at least one actuator coupled to the movable member and a controller coupled to the at least one actuator. The actuator may be configured to drive axial translation of the movable member. The controller may be configured to direct the at least one actuator to axially translate the movable member to the first slot position when the gas turbine engine is in a cruise condition included in the preselected operating conditions.

In some embodiments, the control unit may further include a memory coupled to the controller. The memory may include a plurality of preprogrammed aircraft maneuvers that each correspond to one of the first slot position and the second slot position. The controller may be configured to detect a preprogrammed aircraft maneuver included in the plurality of preprogrammed aircraft maneuvers on the memory. The controller may be configured to direct the at least one actuator to move the movable member to a corresponding position in response to detecting the preprogrammed aircraft maneuver.

In some embodiments, the control unit may further include at least one sensor coupled to the controller. The sensor may be configured to measure one of pressure, air speed, altitude, blade tip timing, blade rotational speed, attitude, and acceleration. The controller may be configured to receive a measurement from the at least one sensor and direct the at least one actuator to move the movable member to a corresponding position in response to the measurement of the at least one sensor.

According to another aspect of the present disclosure, a gas turbine engine may include a fan and a fan case assembly. The fan may include a fan rotor configured to axially translate about an axis of the gas turbine engine and a plurality of fan blades coupled to the fan rotor for axial translation therewith. The fan case assembly may extend circumferentially around the plurality of fan blades radially outward of the plurality of the fan blades.

In some embodiments, the fan case assembly may include a case, a plurality of vanes, and an inlet distortion mitigation system. The case may extend circumferentially at least partway about an axis to define an outer boundary of a gas path of the gas turbine engine. The case may be formed to define a channel that that extends circumferentially at least partway about the axis. The plurality of vanes may be arranged in the channel and spaced apart circumferentially about the axis to define a plurality of openings open to the gas path of the gas turbine engine.

In some embodiments, the inlet distortion mitigation system may include a movable member mounted for movement relative to the case and a control unit. The movable member may be configured to axially translate relative to the case to move between a first slot position and a second slot position. In the first slot position, the movable member may cooperate with the plurality of vanes to define a first set of slots having a first slot depth. In the second slot position, the movable member may cooperate with the plurality of vanes to define a second set of slots having a second slot depth that is greater than the first slot depth.

In some embodiments, the control unit may be configured to move the movable member between the first slot position and the second slot position. The control unit may be configured to move the movable member between the first slot position and the second slot position in response to preselected operating conditions to minimize negative effects pressure and swirl distortions in the gas turbine engine to improve stall margin.

In some embodiments, the movable member may be shaped to define a first set of pockets. The first set of pockets may extend radially to a first pocket depth. The first set of pockets may align with the plurality of openings to define the first set of slots when the movable member is in the first slot position.

In some embodiments, the movable member may be shaped to define a second set of pockets spaced apart axially from the first set of pockets. The second set of pockets may extend radially to a second pocket depth. The second set of pockets may align with the plurality of openings to define the second set of slots when the movable member is in the second slot position. The second pocket depth of the second set of pockets may be greater than the first pocket depth of the first set of pockets.

In some embodiments, the movable closure may include a band and a plurality of flanges. The band may extend circumferentially at least partway about the axis. The plurality of flanges may be spaced apart circumferentially about the axis. Each flange of the plurality of flanges may extend axially from the band between adjacent vanes included in the plurality of vanes.

In some embodiments, each flange of the plurality of flanges may include a first pocket that extends radially to a first pocket depth and a second pocket that extends radially to a second pocket depth. The second pocket may be spaced apart axially from the first pocket. The second pocket depth may be greater than the first pocket depth.

In some embodiments, the first pocket may be configured to align with the plurality of openings to define a first slot when the movable member is in the first slot position. The second pocket may be configured to align with the plurality of openings to define a second slot when the movable member is in the second slot position.

In some embodiments, the inlet distortion mitigation system may further include a movable closure mounted for movement relative to the case. The movable closure may be configured to axially translate relative to the case to move between a closed position and an open position. In the closed position, the movable closure may cover the plurality of openings to block fluid communication between the gas path and one of the first set of pockets and the second set of pockets. In the open position, the movable closure may be spaced apart from the plurality of openings to allow fluid communication between the gas path and the one of the first set of pockets and the second set of pockets.

In some embodiments, the control unit may be configured to move the movable closure between the closed position and the open position. The control unit may be configured to move the movable closure between the closed position and the open position in response to the preselected operating conditions.

In some embodiments, the control unit may include at least one actuator coupled to the movable member and a controller coupled to the at least one actuator. The actuator may be configured to drive axial translation of the movable member. The controller may be configured to direct the at least one actuator to axially translate the movable member to the first slot position when the gas turbine engine is in a cruise condition included in the preselected operating conditions.

In some embodiments, the control unit may further include a memory coupled to the controller. The memory may include a plurality of preprogrammed aircraft maneuvers that each correspond to one of the first slot position and the second slot position.

In some embodiments, the controller may be configured to detect a preprogrammed aircraft maneuver included in the plurality of preprogrammed aircraft maneuvers on the memory. The controller may be configured to direct the at least one actuator to move the movable member to a corresponding position in response to detecting the preprogrammed aircraft maneuver.

In some embodiments, the control unit may further include at least one sensor coupled to the controller. The sensor may be configured to measure one of pressure, air speed, altitude, blade tip timing, blade rotational speed, attitude, and acceleration. The controller may be configured to receive a measurement from the at least one sensor. The controller may be configured to direct the at least one actuator to move the movable member to a corresponding position in response to the measurement of the at least one sensor.

According to another aspect of the present disclosure, a method may include providing a fan case assembly adapted for use with a gas turbine engine. The fan case assembly may include a case, a plurality of vanes, and an inlet distortion mitigation system.

In some embodiments, the case may extend circumferentially at least partway about an axis of the gas turbine engine. The case may be formed to define a channel that that extends circumferentially at least partway about the axis. The plurality of vanes may be arranged in the channel and spaced apart circumferentially about the axis to define a plurality of inlet openings open to a gas path of the gas turbine engine. The inlet distortion mitigation system may include a movable member mounted for axial translation relative to the case.

In some embodiments, the method may further include locating the movable member in a first slot position. In the first slot position, the movable member may cooperate with the plurality of vanes to define a first set of slots having a first slot depth.

In some embodiments, the method may further include translating the movable member axially from the first slot position to a second slot position. In the second slot position, the movable member may cooperate with the plurality of vanes to define a second set of slots having a second slot depth that is greater than the first slot depth. The movable member may be translated axially in response to one preselected operating condition included in a plurality of preselected operating conditions.

In some embodiments, the inlet distortion mitigation system may further include a movable closure. The movable closure may be mounted for axial translation relative to the case.

In some embodiments, the method may further include locating the movable closure in a closed position. In the closed position, the movable closure may cover the plurality of openings to block fluid communication between the gas path and one of the first set of slots and the second set of slots.

In some embodiments, the method may further include translating the movable closure from the closed position to an open position. In the open position, the movable closure may be spaced apart from the plurality of openings to allow fluid communication between the gas path and the one of the first set of slots and the second set of slots.

These and other features of the present disclosure will become more apparent from the following description of the illustrative embodiments.

BRIEF DESCRIPTION OF THE DRAWINGS

FIG. 2 is a detail view of the fan case assembly included in the gas turbine engine of FIG. 1 showing that the fan case assembly includes a case that extends circumferentially at least partway about an axis of the engine radially outward of the fan blades to define an outer boundary of a gas path of the gas turbine engine, a plurality of a plurality of vanes arranged in a channel defined by the case to form a plurality of openings open to the gas path, and an inlet distortion mitigation system that includes a movable member mounted for axial translation relative to the case between a first slot position as shown in FIGS. 5A and 5B and a second slot position as shown in FIGS. 6A and 6B, a movable closure mounted for axial translation relative to the axis between an open position as shown in FIGS. 5 and 6 and a closed position as shown in FIGS. 7A and 7B, and control unit configured to move the movable member and the movable closure between the different positions in response to preselected operating conditions to control the depth of the slots located between the plurality of vanes so as to minimize the negative effects of pressure and swirl distortions in the gas turbine engine to improve stall margin;

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figures 1, 2:
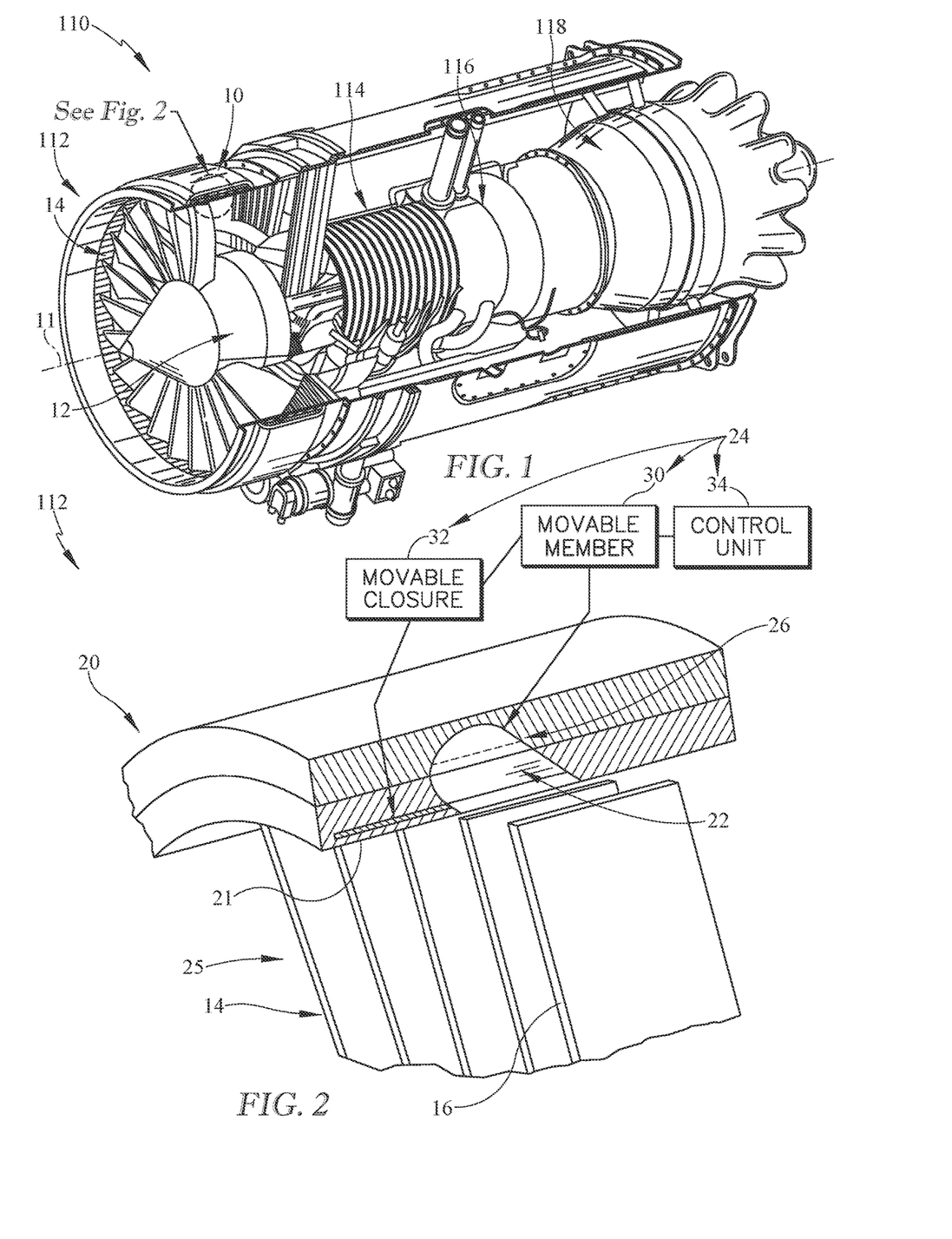
FIG. 1 is a cutaway view of a gas turbine engine that includes a fan, a compressor, a combustor, and a turbine, the fan including fan rotor configured to axially translate about an axis of the engine and a fan case assembly that surrounds fan blades included in the fan rotor.
Figure 3:
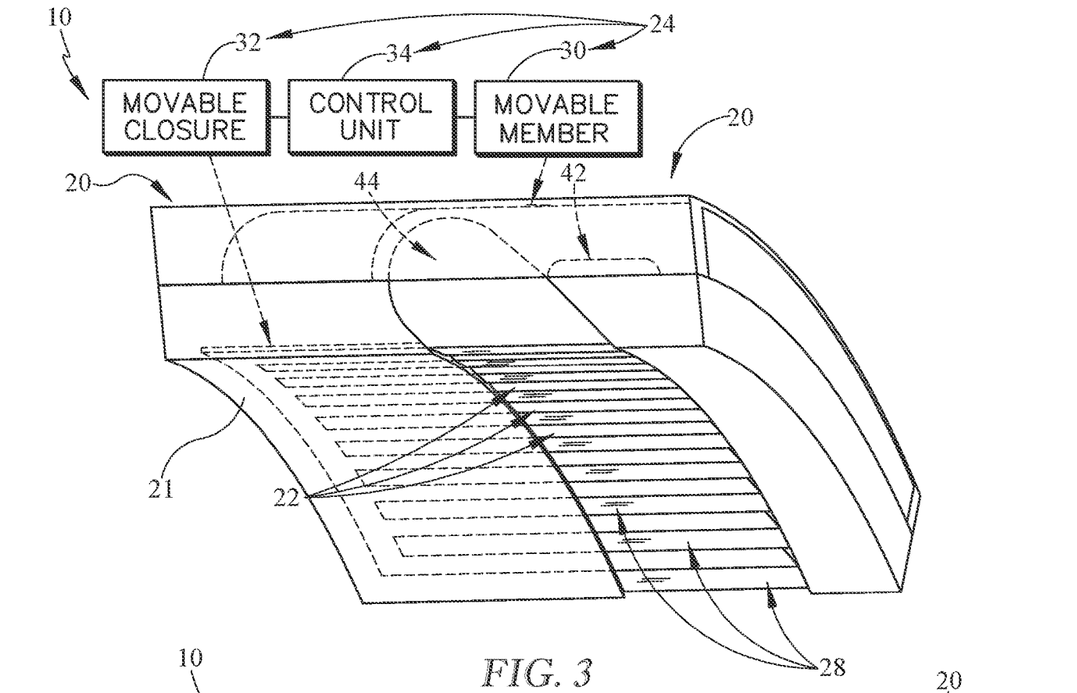
FIG. 3 is a perspective view of the fan case assembly of FIG. 2 showing the movable member is located in the channel radially outward of the plurality of vanes.

A fan case assembly 10 is adapted for use in a gas turbine engine 110 as shown in FIG. 1. The gas turbine engine 110 includes a fan 112, a compressor 114, a combustor 116, and a turbine 118 as shown in FIG. 1. The fan 112 is driven by the turbine 118 and provides thrust for propelling an aircraft. The compressor 114 compresses and delivers air to the combustor 116. The combustor 116 mixes fuel with the compressed air received from the compressor 114 and ignites the fuel. The hot, high pressure products of the combustion reaction in the combustor 116 are directed into the turbine 118 to cause the turbine 118 to axially translate about an axis 11 of the gas turbine engine 110 and drive the compressor 114 and the fan 112.

The fan 112 includes a fan rotor 12 and a fan case assembly 10 as shown in FIG. 1. The fan rotor 12 has a number of fan blades 14. The fan case assembly 10 extends circumferentially around the fan blades 14 of the fan rotor 12 such that the fan case assembly 10 is aligned axially with the fan blades 14.

The fan case assembly 10 includes, among other components, a case 20, a plurality of vanes 22, and an inlet distortion mitigation system 24 as shown in FIGS. 2-7. The case 20 extends circumferentially at least partway about the axis 11 to define an outer boundary of a gas path 25 of the gas turbine engine 110. The case 20 is formed to define a channel 26 that extends circumferentially at least partway about the axis 11 and is open to the gas path 25 of the gas turbine engine 110. The plurality of vanes 22 are arranged in the channel 26. The plurality of vanes 22 are spaced apart circumferentially about the axis 11 to define a plurality of openings 28 in fluid communication with the channel 26. The inlet distortion mitigation system 24 is configured to control the depth of slots formed between the plurality of vanes 22.

The inlet distortion mitigation system 24 includes a movable member 30 and a control unit 34 as shown in FIGS. 2-7. The movable member 30 is mounted for axial translation about the axis 11 relative to the case 20 between a first slot position as shown in FIGS. 5A and 5B and a second slot position as shown in FIGS. 6A and 6B. The control unit 34 is configured to axially translate the movable member 30 between the different positions in response to preselected operating conditions to control the depth of slots formed between the plurality of vanes 22 so as to minimize the negative effects of pressure and swirl distortions in the gas turbine engine 110 to improve stall margin for the gas turbine engine 110.

Embedded engines on an aircraft may experience high distortion in the form of pressure gradients and swirl. The pressure and swirl distortions may cause engine stall or other undesirable aeromechanical behavior. Additionally, there may be points during a mission or moments with maneuvers where it may be desirable to incorporate a different available stall margin. Attempting to solve the worst stall condition while maintaining performance over all of the cycles or flight conditions may be difficult and result in compromised efficiency or a limited flight envelope.

Therefore, the fan case assembly 10 includes the inlet distortion mitigation system 24 which includes the movable member 30 that axially translates about the axis 11 relative to the case 20 to control the depth of the slots located between the plurality of vanes 22. In this way, the negatives effects of pressure and swirl distortions are minimized to improve stall margin. The negative effects may include loss of efficiency or overall performance of the engine 110 and/or other negative operating conditions known to one of ordinary skill in the art.

Figure 5A:
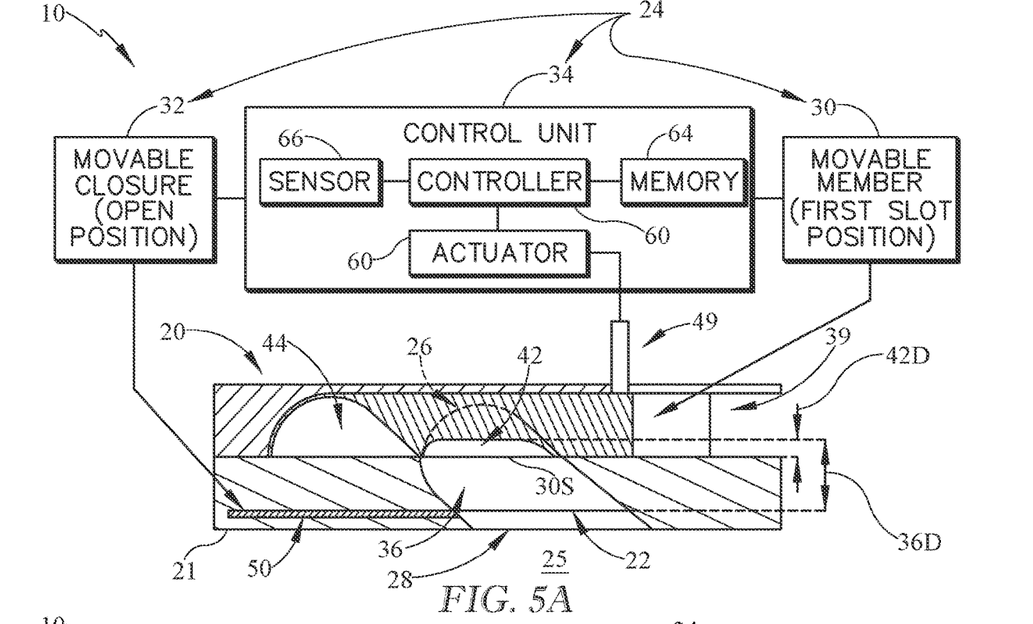
FIG. 5A is a cross-section view of the fan case assembly of FIG. 3 showing the movable member in the first slot position in which the first set of pockets align with the plurality of openings to define a first set of slots having a first slot depth and the second set of pockets align with the plurality of vanes.
Figure 5B:
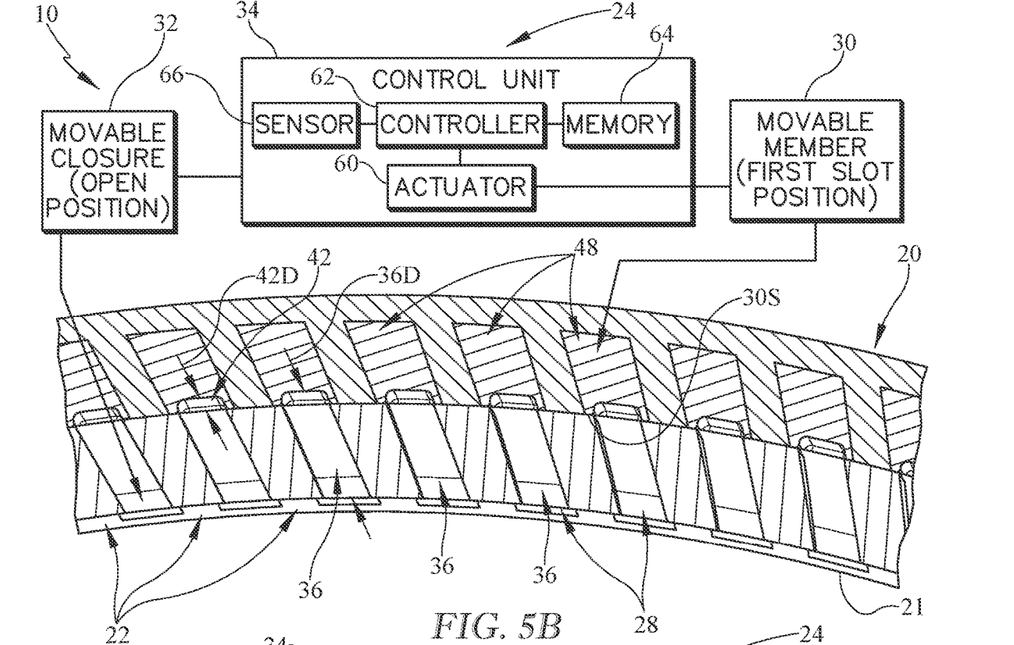
FIG. 5B is a cross-section view of the fan case assembly of FIG. 3 showing the movable member in the first slot position showing the first set of slots have a first slot depth.

In the first slot position, the movable member 30 cooperates with the plurality of vanes 22 to define a first set of slots 36 having a first slot depth 36D as shown in FIG. 5B. In the second slot position, the movable member 30 cooperates with the plurality of vanes 22 to define a second set of slots 38 having a second slot depth 38D as shown in FIG. 6B. The second slot depth 38D is greater than the first slot depth 36D.

The control unit 34 is configured to move the movable member 30 between the first slot position and the second slot position in response to preselected operating conditions. The preselected operating conditions include a plurality of preprogrammed aircraft maneuvers stored on a memory 64 included in the control unit 34. The plurality of preprogrammed aircraft maneuvers include banks, turns, rolls, etc.

The control unit 34 is configured to detect a preprogrammed aircraft maneuver included in the plurality of preprogrammed aircraft maneuvers on the memory 64. Once the preprogrammed aircraft maneuver is detected, the control unit 34 directs the movable member to move to one of the first slot position and the second slot position in response to detecting the preprogrammed aircraft maneuver.

For example, the movable member 30 may normally be in the first slot position during cruise so that minimal additional stall margin is created, but performance is not compromised. The cruise condition included in the preselected operating conditions corresponds when the aircraft is in the cruise portion of the flight cycle.

Then, when the control unit 34 detects a preprogrammed aircraft maneuver, i.e. banks, turns, rolls, the control unit 34 directs the movable member 30 to axially translate about the axis 11 to the second slot position so that the second set of slots 38 are formed. This allows for more radial and some forward flow compared to the first set of slots 36.

Conversely, when the control unit 34 detects the cruise condition after a preprogrammed aircraft maneuver, the control unit 34 directs the movable member 30 to move to the first slot position. Therefore, once the aircraft maneuver is completed, the movable member 30 moves to the first slot position so that performance is not compromised and the additional stall margin is removed during the cruise condition.

The preselected operating conditions may further include a sensor input from at least one sensor 66 included in the control unit 34. The sensor 66 is configured to measure one of pressure, air speed, and acceleration. The sensor 66 is also configured to detect distortion, fan stall, and/or other aeromechanical issues. In some embodiments, the control unit 34 includes a plurality of sensors 66 each configured to measure one of pressure, air speed, and acceleration and/or detect distortion, fan stall, and/or other aeromechanical issues.

The sensor 66 may include one of or a combination of dynamic sensors, static wall pressure sensors, altitude sensors, sensors configured to detect the angle of attack of the plurality of fan blades 14, sensors configured to detect the tip timing of the plurality of fan blades 14, and air speed sensors. In some embodiments, the sensor 66 may be a dynamic pressure transducer. The sensor 66 may also be a sensor configured to measure a rotation speed of the fan blades 14, which could be used along with an additional sensor that is a dynamic pressure transducer. In some embodiments, the sensor 66 may be a sensor configured to measure a rotation speed of another section of the engine 110.

The preselected operating conditions may further include a sensor input from the sensor 66 or sensors 66 included in the control unit 34. The sensor 66 is configured to measure one of pressure, air speed, altitude, blade tip timing, blade rotational speed, attitude or aircraft orientation, and acceleration.

The control unit 34 is configured to receive a measurement from the at least one sensor 66 or sensors 66 and direct the movable member 30 to move to a corresponding position in response to the measurement of the at least one sensor 66. The control unit 34 may be configured to direct the movable member 30 to be in the first slot position when the measurements from the sensor 66 are within a predetermined threshold.

Then, when the measurement from the sensor 66 is outside of the predetermined threshold, the control unit 34 directs the movable member 30 to move to the second slot position. Based on the difference of the measurement from the sensor 66 compared to the predetermined threshold, the control unit 34 may change the position of the movable member 30 to control the depth of the slots 36, 38.

In some embodiments, the control unit 34 may be configured to use a combination of the sensor measurements and the detected preprogrammed aircraft maneuver to control the position of the movable member 30. For example, when the control unit 34 detects a preprogrammed aircraft maneuver and the measurement is outside of the predetermined threshold, the control unit 34 directs the movable member 30 axially translate to the second slot position.

In some embodiments, the control unit 34 is configured to use the measurements from the sensor 66 to anticipate the aircraft maneuver. The control unit 34 is configured to direct the movable member 30 to move to the second slot position in response to the measurement from the sensor 66 even though no preprogrammed aircraft maneuver is detected.

Alternatively, there may be a delay in the measurements from the sensor 66. Therefore, the control unit 34 is also configured to direct the movable member 30 to move to the second slot position when the one of the preprogrammed aircraft maneuvers is detected, even though the measurements from the sensor 66 are within the predetermined thresholds.

In some embodiments, the control unit 34 may detect one of the preprogrammed aircraft maneuvers, but the measurements from the sensors 66 are within the predetermined threshold. If so, the control unit 34 may direct the movable member 30 to remain in the current position.

The movable member 30 is shaped to define a first set of pockets 42 and a second set of pockets 44 as shown in FIGS. 2-7. Each pocket 44 of the second set of pockets 44 are axially spaced apart from the first set of pockets 42.

The first set of pockets 42 align with the plurality of openings 28 to define the first set of slots 36 when the movable member 30 is in the first slot position. The second set of pockets 44 align with the plurality of openings 28 to define the second set of slots 38 when the movable member 30 is in the second slot position.

The first set of pockets 42 extend radially into an inner surface 30S of the movable member 30 as shown in FIG. 5. The first set of pockets 42 extend radially into the inner surface 30S to a first pocket depth 42D.

Figure 6A:
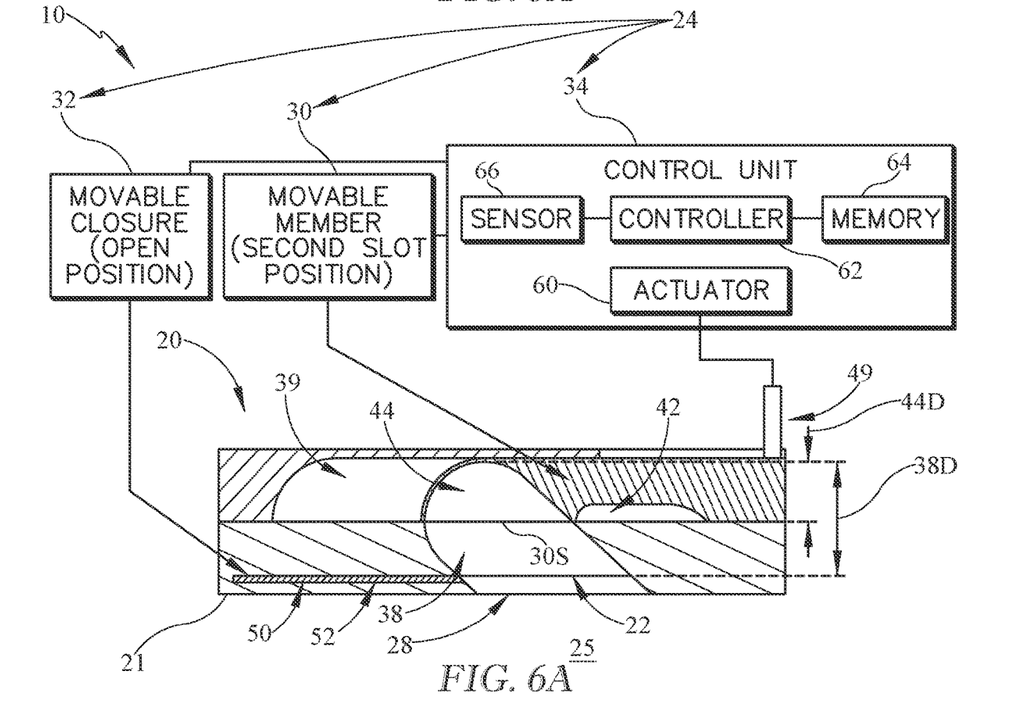
FIG. 6A is a cross-section view of the fan case assembly of FIG. 3 showing the movable member in the second slot position in which the second set of pockets align with the plurality of openings to define a second set of slots having a second slot depth that is greater than the first slot depth and the first set of pockets align with the plurality of vanes.
Figure 6B:
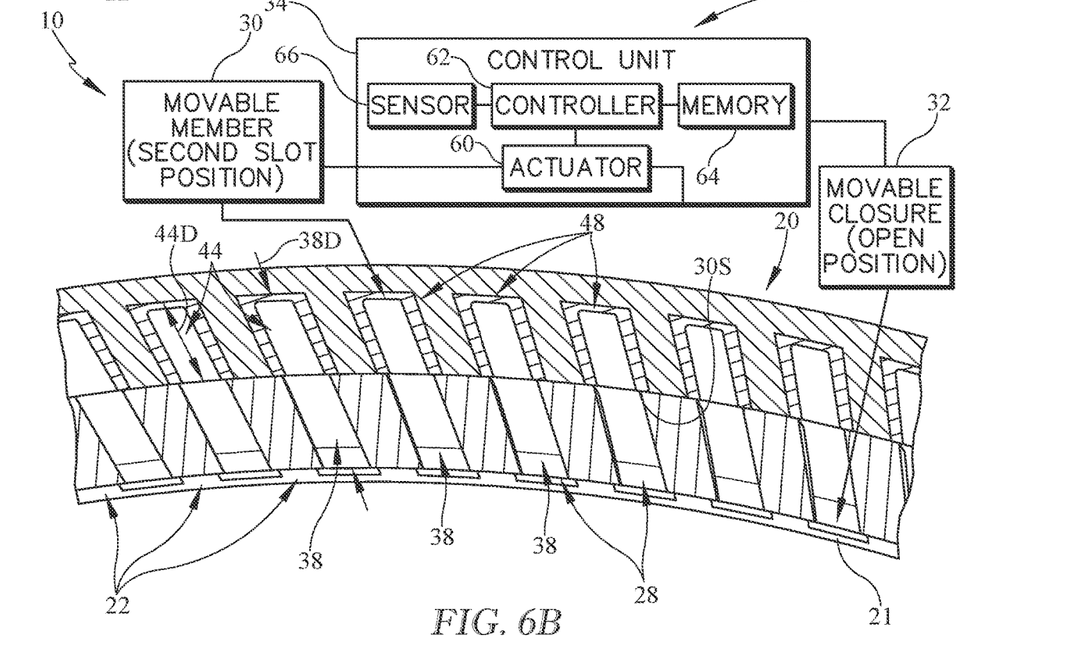
FIG. 6B is a cross-section view of the fan case assembly of FIG. 3 showing the movable member in the second slot position showing the second set of slots have a second slot depth.

The second set of pockets 44 extend radially into the inner surface 30S of the movable member 30 as shown in FIG. 6.

The second set of pockets 44 extend radially into the inner surface 30S to a second pocket depth 44D.

In other embodiments, the moveable member 30 only includes one set of pockets 42, 44 and the inner surface 30S of the movable member 30 forms the first set of slots 36 when the movable member 30 is in the first slot position. Instead of having pockets 42 align with the openings 28, the inner surface 30S and the vanes 22 define the first set of slots 36. Alternatively, the movable member only includes the first set of pockets 42 and the inner surface 30S defines the second set of slots 38 in some embodiments.

The movable member 30 includes a band 46 and a plurality of flanges 48 as shown in FIGS. 2-7. The band 46 extends circumferentially at least partway about the axis 11. The plurality of flanges 48 are spaced apart circumferentially about the axis 11. Each flange 48 extends extend axially from the band 46 between adjacent vanes 22 of the plurality of vanes 22. The plurality of flanges 48 are located radially outward of the vanes 22 as shown in FIGS. 2-7.

Figure 7A:
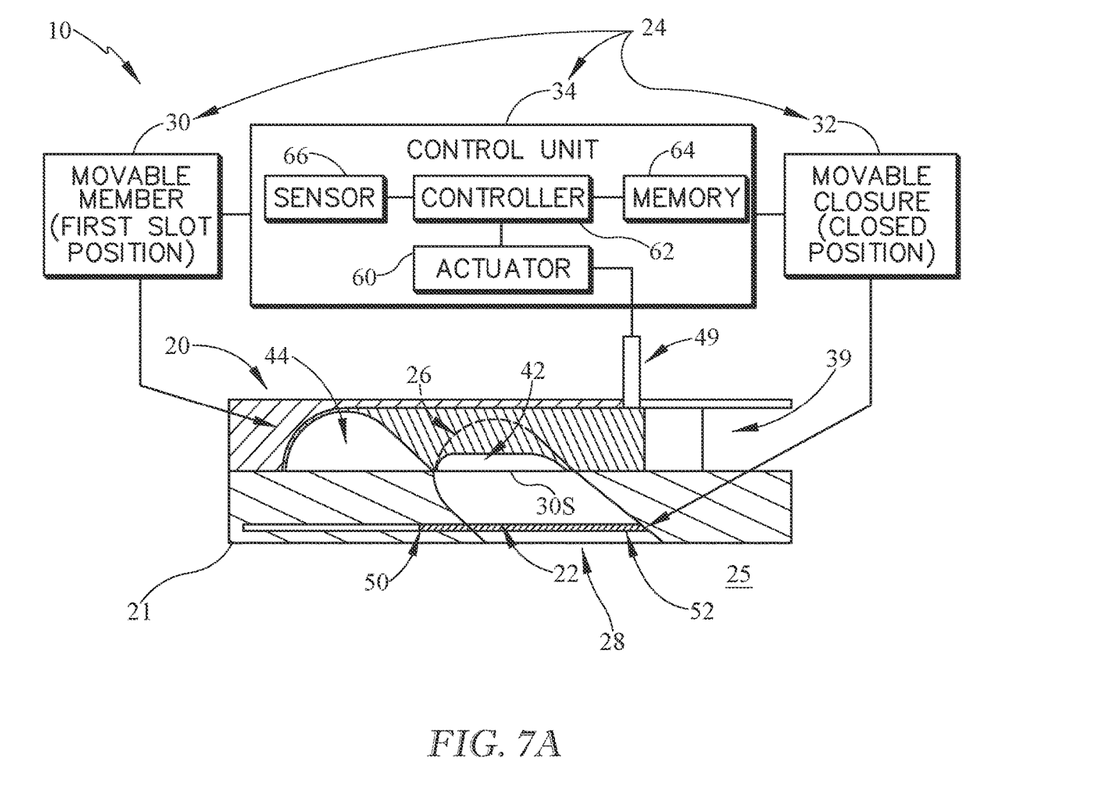
FIG. 7A is a cross-section view of the fan case assembly of FIG. 3 showing the movable closure covers the plurality of openings to the channel to block fluid communication between the gas path and the first or second set of slots when the movable closure is in the closed position.
Figure 7B:
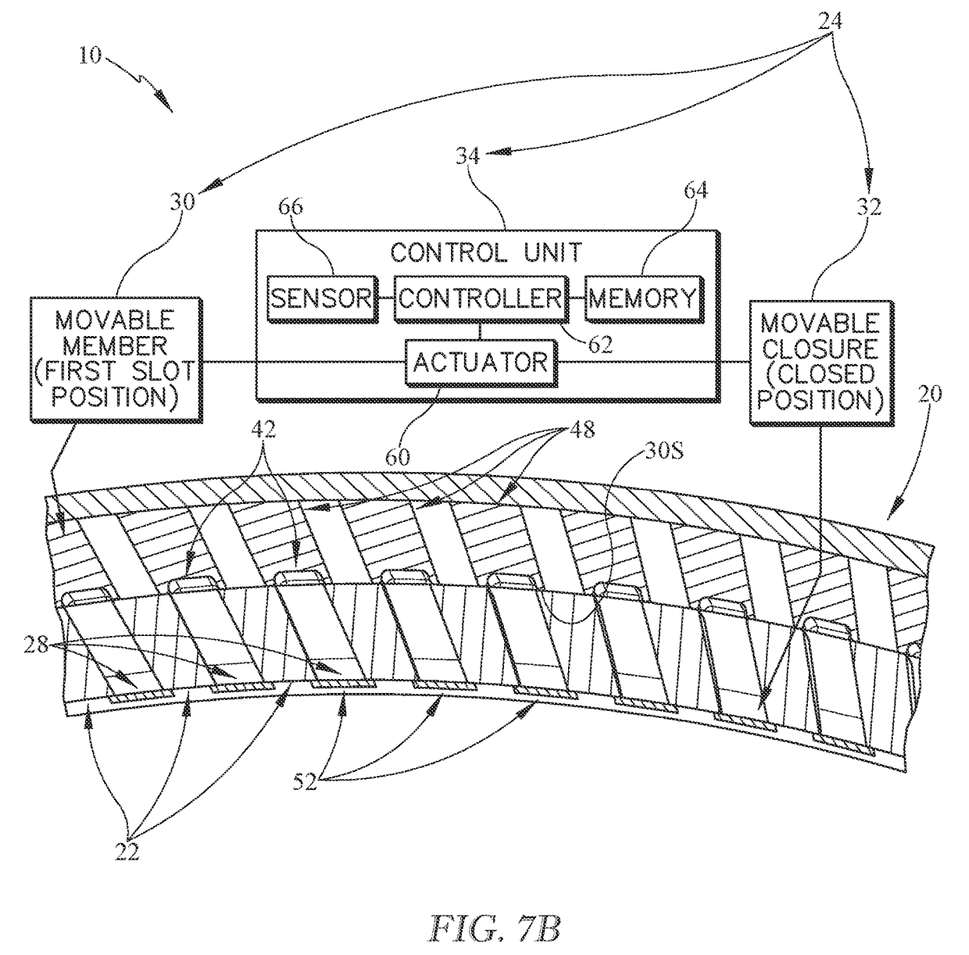
FIG. 7B is a cross-section view of the fan case assembly of FIG. 3 showing the movable closure in the closed position.

Each flange 48 of the plurality of flanges 48 is shaped to include a first pocket 42 included in the first set of pockets 42 and a second pocket 44 included in the second set of pockets 44 as shown in FIGS. 5-7. The second pocket 44 is spaced apart axially from the first pocket 42. In the illustrative embodiment, the second pocket 44 is axially forward of the first pocket 42. In some embodiments, the second pocket 44 is axially aft of the first pocket 42.

In in the illustrative embodiment, the inlet distortion mitigation system 24 further includes a movable closure 32 as shown in FIGS. 2-7. The movable closure 32 is mounted for axial translation relative to the case 20 between an open position as shown in FIGS. 5 and 6 and a closed position as shown in FIG. 7.

In the open position, the movable closure 32 is spaced apart axially from the plurality of openings 28 to allow fluid communication between the gas path 25 and either set of slots 36, 38. In the closed position, the movable closure 32 covers the plurality of openings 28 to block fluid communication between the gas path 25 and the one of the either set of slots 36, 38 formed by the plurality of vanes 22 and the movable member 30.

The fan case assembly 310 includes the movable closure 32 so as to be able to close off fluid communication to the slots 36, 38 between the vanes 22. When in the closed position, no additional stall margin is created, but overall efficiency of the gas turbine engine 110 is maintained.

The control unit 34 is configured to move the movable member 30 between the first and second slot positions and to move the movable closure 32 between the closed and open positions in response to the preselected operating conditions which includes the plurality of preprogrammed aircraft maneuvers. The control unit 34 is configured to detect a preprogrammed aircraft maneuver included in the plurality of preprogrammed aircraft maneuvers on the memory 64. Once the preprogrammed aircraft maneuver is detected, the control unit 34 directs the movable closure 32 to move to the open position and the movable member 30 to move to one of the first slot position and the second slot position in response to detecting the preprogrammed aircraft maneuver.

For example, the movable closure 32 may normally be in closed position during cruise to cover the plurality of openings 28 so that no additional stall margin is created, but performance is not compromised. Then, when the control unit 34 detects a preprogrammed aircraft maneuver, i.e. banks, turns, rolls, the control unit 34 directs the movable closure 32 to axially translate about the axis 11 to the open position so that the openings 28 formed between the vanes 22 are uncovered.

Additionally, the control unit 34 is also configured to direct the movable member 30 to axially translate about the axis 11 to one of the first and second slot positions when the control unit 34 detects a preprogrammed aircraft maneuver associated therewith. When the control unit 34 detects the preprogrammed aircraft maneuver, i.e. banks, turns, rolls, the control unit 34 directs the movable closure 32 to move to the open position, while simultaneously directing the movable member 30 to move to one of the first and second slot positions.

In some embodiments, the movable member 30 may normally be in the first slot position when the movable closure 32 is in the closed position. In some embodiments, the movable member 30 may normally be in the second slot position when the movable closure 32 is in the closed position.

The control unit 34 may direct the movable member 30 to either stay in the current slot position, i.e. the first slot position or the second slot position, when the movable closure 32 is moved to the open position. Alternatively, the control unit 34 may direct the movable member 30 to move to the other slot position when the movable closure 32 moved to the open position. The control unit 34 directs the movable member 30 to axially translate about the axis 11 to the second slot position so that the second set of slots 38 are formed. This allows for more radial and some forward flow compared to the first set of slots 36.

The preselected operating conditions may further include a sensor input from at least one sensor included in the control unit 34. The sensor is configured to measure one of pressure, air speed, and acceleration. In some embodiments, the control unit 34 includes a plurality of sensors each configured to measure one of pressure, air speed, and acceleration.

The control unit 34 is configured to receive a measurement from the at least one sensor or sensors and direct the movable closure 32 and/or the movable member 30 to move to a corresponding position in response to the measurement of the at least one sensor. The control unit 34 may be configured to direct the movable closure 32 to be in the closed position when the measurements from the sensor are within a predetermined threshold.

Then, when the measurement from the sensor is outside of the predetermined threshold, the control unit 34 directs the movable closure 32 to move to the open position. Simultaneously, the control unit 34 may direct the movable member 30 to be in the appropriate position as the movable closure 32 is moved to the open position.

In some embodiments, the control unit 34 may be configured to use a combination of the sensor measurements and the detected preprogrammed aircraft maneuver to control the position of the movable member 30. For example, when the control unit 34 detects a preprogrammed aircraft maneuver and the measurement is outside of the predetermined threshold, the control unit 34 directs the movable closure 32 axially translate to the open position.

In some embodiments, the control unit 34 is configured to use the measurements from the sensor to anticipate the aircraft maneuver. The control unit 34 is configured to direct the movable closure 32 to move to the open position in response to the measurement from the sensor even though no preprogrammed aircraft maneuver is detected.

Alternatively, there may be a delay in the measurements from the sensor. Therefore, the control unit 34 is also configured to direct the movable closure 32 to move to the open position when the one of the preprogrammed aircraft maneuvers is detected, even though the measurements from the sensor are within the predetermined thresholds.

In some embodiments, the control unit 34 may detect one of the preprogrammed aircraft maneuvers, but the measurements from the sensors are within the predetermined threshold. If so, the control unit 34 may direct the movable closure 32 to remain in the current position.

Figure 4:
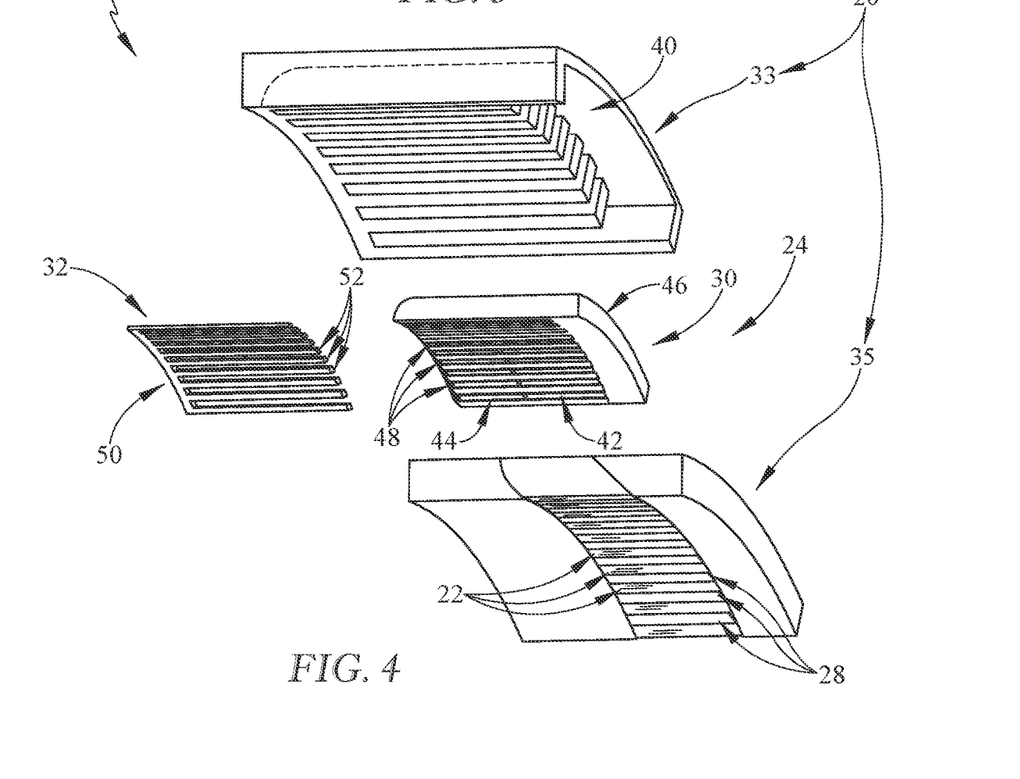
FIG. 4 is an exploded view of the fan case assembly of FIG. 3 showing the movable member is shaped to include a first set of pockets and a second set of pockets axially spaced apart from the first set of pockets.

The movable closure 32 includes a band 50 and a plurality of flanges 52 as shown in FIG. 4. The band 50 extends circumferentially at least partway about the axis 11. The plurality of flanges 52 extend axially from the band 50. Each of the flanges 52 covers the plurality of openings 28 between each of the vanes 22 when the movable closure 32 is in the closed position.

In some embodiments, the inlet distortion mitigation system 24 does not include the movable closure 32. Rather, the inlet distortion mitigation system 24 only includes the movable member 30 to control the slot depth.

Turning again to the fan case assembly 10, the fan case assembly 10 extends circumferentially at least partway about the axis 11 in the illustrative embodiment. In some embodiments, the fan 112 may include multiple fan case assemblies 10 arranged circumferentially about the axis 11 to form a full hoop. In other embodiments, the fan case assembly 10 may be annular and extends circumferentially about the axis 11. In some embodiments, the case 20 may extend around the axis 11, while the channel 26 only extends partway about the axis 11.

In some embodiments, the fan 112 may include multiple fan case assemblies 10 spaced apart circumferentially about the axis 11 to define segments between each fan case assembly 10. The segments between the fan case assemblies 10 does not have a channel 26.

In some embodiments, the case 20 is a split case. The case 20 includes sections 33, 35 that are coupled to together to trap the movable member 30 there between as shown in FIG. 4. The outer section 33 of the case 20 includes a plurality of pockets 40 that receive the movable member 30.

The case 20 is formed to define the channel 26 that extends circumferentially at least partway about the axis 11 as shown in FIGS. 2-7. The plurality of vanes 22 are arranged in the channel 26 to define the plurality of openings 28 in fluid communication with the channel 26.

The channel 26 is formed in the case 20 so that the channel 26 is located at a leading edge 16 of each of the fan blades 14 as shown in FIG. 2. In the illustrative embodiment, the channel 26 has a forward leaning cross-sectional shape, as shown in FIGS. 2-7. In other embodiments, the channel 26 may have another cross-sectional shape.

Each of the vanes 22 extends axially across the channel 26 as shown in FIGS. 2-7. In the illustrative embodiment, the vanes 22 are tilted circumferentially relative to the axis 11. Each of the first and second sets of pockets 42, 44 also extend radially and circumferentially into the movable member 30.

In the illustrative embodiment, the plurality of vanes 22 only extend axially across the channel 26. Each of the pockets 42, 44 only extend axially to align with the openings 28 between each of the vanes 22.

In other embodiments, the plurality of vanes 22 extend axially and circumferentially across the channel 26. In such embodiments, the pockets 42, 44 extend axially and circumferentially across the channel 26 to align with the openings 28 defined between the adjacent vanes 22.

The inlet distortion mitigation system 24 includes the movable member 30 and the control unit 34 as shown in FIGS. 2-7. The movable member 30 includes the first set of pockets 42 and the second set of pockets 44 that are alternated between each other about the axis 11.

In the illustrative embodiment, the second set of pockets 44 each has a cross-sectional shape that matches a cross-sectional shape of a portion of the channel 26 when viewed in the circumferential direction as shown in FIGS. 5A and 6A. Each pocket 44 has a forward leaning cross-sectional shape in the illustrative embodiment. In some embodiments, the cross-section shape of the pockets 44 may be a different shape compared to the cross-sectional shape of the channel 26. The first set of pockets 42 have a different cross-sectional shape than the second set of pockets 44 in the illustrative embodiment.

In the illustrative embodiment, the movable member 30 includes the first set of pockets 42 that cooperate with the plurality of vanes 22 to form the first set of slots 36 and the second set of pockets 44 that cooperate with the plurality of vanes 22 to form the second set of slots 38. In other embodiments, the movable member 30 only includes one set of pockets, while the inner surface 30S of the movable member 30 cooperates with the plurality of vanes 22 to define the first set of slots 36.

In other words, in the first slot position, the inner surface 30S of the movable member 30 forms part of each slot 36. In the second slot position, one set of pockets 42, 44 cooperates with the vanes 22 to form the second set of slots 38 that have a greater slot depth than the first set of slots 36.

In the illustrative embodiment, the movable member 30 includes the band 46, the plurality of flanges 48, and a rod 49 as shown in FIGS. 5A, 6A, and 7A. The band 46 extends circumferentially at least partway about the axis 11. The plurality of flanges 48 extend axially away from the band 46. The rod 49 is coupled to the band 46 of the movable member 30 and extends radially outward through the case 20 to be coupled an actuator 60 included in the control unit 34.

In some embodiments, the movable member 30 may include a rack and pinion assembly to drive axial translation of the movable member 30. Instead of extending through the case 20, the rod 49 may be contained in the case and function as a rack with teeth that mate with a corresponding gear. The gear may be coupled to the actuator 60 of the control unit 34 to drive axial translation of the gear which in turn drives axial translation of the band 46.

In some embodiments, another suitable actuation assembly may be used. For example, the movable member 30 may include an actuation system similar to those used to control variable vanes. The movable member 30 may include another suitable mechanical drive mechanism or linkage coupled to the band 46 to drive axial translation of the band 46 about the axis 11.

The control unit 34 includes at least one actuator 60, a controller 62, a memory 64, and at least one sensor 66 as shown in FIGS. 2-7. The actuator 60 is coupled to the movable member 30. The actuator 60 is configured to drive axial translation of the movable member 30. The controller 62 is coupled to the actuator 60 to direct the actuator 60 to axially translate the movable member 30 between the different positions.

In some embodiments, the control unit 34 includes at least one actuator 60. In some embodiments, the actuator 60 may include pneumatic or electric actuators, or combinations of hydraulic, pneumatic, and electric. Any other actuator known to a person skilled in the art could be utilized as well. The actuator 60 is configured to drive axial translation of the movable member 30 between the first slot position FIGS. 5A and 5B and the second slot position as shown in FIGS. 6A and 6B.

In the illustrative embodiment, the control unit 34 includes a single actuator 60 coupled to the rod 49 to drive axial translation of the movable member 30. If the fan 112 includes multiple fan case assemblies 10 spaced apart around the axis 11, the control unit 34 may include multiple actuators 60 to control axial translation of each movable member 30. Each actuator 60 may be coupled to the rod 49 included in the respective movable member 30.

In some embodiments, the movable member 30 may not include the band 46 or the rod 49. Instead, the control unit 34 includes a plurality of actuators 60 each coupled to a respective flange 48 to control the position of each flange 48 individually. In some embodiments, the movable member 30 may include a rod 49 for each respective flange 48 and the control unit 34 may include a plurality of actuators 60 each coupled to one of the respective rods 49.

The controller 62 is configured to direct the actuator 60 to move the movable member 30 between the different positions in response to preselected operating conditions. The preselected operating conditions include the plurality of preprogrammed aircraft maneuvers stored on the memory 64 included in the control unit 34.

The controller 62 of the control unit 34 is configured to detect a preprogrammed aircraft maneuver included in the plurality of preprogrammed aircraft maneuvers on the memory 64. Once the preprogrammed aircraft maneuver is detected, the controller 62 directs the actuator 60 to drive axial translation of the movable member 30 to a corresponding position in response to detecting the preprogrammed aircraft maneuver.

If the movable member 30 does not include a band 46, the controller 62 may be configured to direct the separate actuators 60 to drive axial translation of the movable member 30 to a corresponding position in response to detecting the preprogrammed aircraft maneuver. The controller 62 may direct some or all of the actuators 60 to drive axial translation of certain flanges 48 in response to detecting the preprogrammed aircraft maneuver.

Therefore, some of the flanges 42 of the movable member 30 may be in the closed position, while others are in the open position or the one of the intermediate positions. Additionally, some of the flanges 42 may be axially translated to one intermediate open position while others are moved to another intermediate open position.

The preselected operating conditions may further include a sensor input from the sensor 66 or sensors 66 included in the control unit 34. The sensor 66 is configured to measure one of pressure, air speed, and acceleration.

The controller 62 of the control unit 34 is configured to receive a measurement from the sensor 66 or sensors 66 and direct the actuator 60 to move the movable member 30 to a corresponding position in response to the measurement of the at least one sensor 66. The controller 62 of the control unit 34 may be configured to direct actuator 60 to move the movable member 30 to the closed position when the measurements from the sensor 66 are within a predetermined threshold.

Then, when the measurement from the sensor 66 is outside of the predetermined threshold, the controller 62 directs the actuator 60 to move the movable member 30 to the first slot position. Based on the difference of the measurement from the sensor 66 compared to the predetermined threshold, the controller 62 may change the position of the movable member 30 to control the depth of the slots 36, 38.

In some embodiments, the controller 62 of the control unit 34 may be configured to use a combination of the sensor measurements and the detected preprogrammed aircraft maneuver to control the position of the movable member 30. For example, when the controller 62 of the control unit 34 detects a preprogrammed aircraft maneuver and the measurement is outside of the predetermined threshold, the controller 62 directs the actuator 60 to axially translate the movable member 30 to first slot position.

In some embodiments, the controller 62 of the control unit 34 is configured to use the measurements from the sensor 66 to anticipate the aircraft maneuver. The controller 62 of the control unit 34 is configured to direct the actuator 60 to move the movable member 30 to the first slot position in response to the measurement from the sensor 66 even though no preprogrammed aircraft maneuver is detected.

Alternatively, there may be a delay in the measurements from the sensor 66. Therefore, the controller 62 of the control unit 34 is also configured to direct the actuator 60 to move the movable member 30 to the first slot position when the one of the preprogrammed aircraft maneuvers is detected, even though the measurements from the sensor 66 are within the predetermined thresholds.

In some embodiments, the controller 62 of the control unit 34 may detect one of the preprogrammed aircraft maneuvers, but the measurements from the sensors 66 are within the predetermined threshold. If so, the controller 62 of the control unit 34 may direct the movable member 30 to remain in the current position.

A method of operating the inlet distortion mitigation system 24 may include several steps. During normal cruise conditions, the controller 62 directs the actuator 60 to locate the movable member 30 in the first slot position. If the controller 62 detects one of the preselected operating conditions other than the cruise condition, the controller 62 directs the actuator 60 to axially translate the movable member 30 to the second slot position to minimize the negative effects of pressure and swirl distortions to improve stall margin.

The method further includes continually adjusting the position of the movable member 30 based on the preselected operating conditions of the engine 110. If the controller 62 detects the cruise condition, the controller 62 directs the actuator 60 to move the movable member 30 back to the first slot position. In other instances, the controller 62 may direct the actuator 60 to control the position of the movable member 30 as discussed above based on the preprogrammed aircraft maneuvers and/or the measurements from the sensors 66.

The method further includes locating the movable closure 32 in the closed position. During normal cruise conditions, the movable closure 32 covers the plurality of openings 28 to block fluid communication between the gas path 25 and one of the first set of slots 36 and the second set of slots 38.

The method further includes continually adjusting the position of the movable closure 32 based on the preselected operating conditions of the engine 110. If the controller 62 detects the one of the preselected operating conditions, the method may include translating the movable closure 32 from the closed position to the open position.

When dealing with embedded inlet distortion, there may be a steep trade between stall margin and performance of the engine. There may be points during a mission or moments with maneuvers where it may be desirable to incorporate a different available stall margin. Attempting to solve the worst stall condition, while maintaining performance over all of the cycle or flight conditions may be difficult and result in compromised efficiency or a limited flight envelope.

Therefore, the fan 112 includes an inlet distortion mitigation system 24 which includes the movable member 30 configured to control depths of slots formed between adjacent vans 22 in the channel 26. The channel 26 is formed in the case 20 at the leading edge 16 of the fan blades 14. The plurality of vanes 22 are arranged in the channel 26.

The movable member 30 has two features milled into its inner diameter or inner surface 30S. In the first condition, there is a short pocket 42, but generally limited to form a shallow axial slot in combination with the movable member 30. In a second condition, there is a shelled pocket 44 that allows for more radial and some forward flow. This may permit higher stall margin relative to the more limited axial slot 42.

Additionally, there may be an inner-most ring or movable closure 32 that is able to be opened to permit flow into the axial slots 36, 38, or be closed off to have no additional stall margin. In the closed position, there may be no additional stall margin, but the system may retain better performance. Alternatively, the movable closure 32 may be axial in nature.

This permits some stall margin benefit in the first condition and then an enhanced capability when needed, with axial translation of the movable member 30 and/or the movable closure 32. It permits the engine 110 to be designed with three potential configurations, which allow it to be optimized to different conditions with one assembly. This is beneficial to eliminating a troublesome trade between stall margin and performance potentially, or the system may be able to handle more extreme inlet distortion during maneuvering.

In some embodiments, instead of the movable member 30 closing off the tip treatment, the pockets 42 may be very shallow and give only a little benefit with very little efficiency debit. The pockets 42 may be open all the time such that the second set of pockets 44 are activated when needed.

The fan case assembly 10 includes the case 20 and vanes 22 that leading to the movable member 30. The movable member 30 includes pockets 42, 44. The pockets 42, 44 may be skewed to the side. The fore/aft walls of each vane 22 are angled as well. When the movable member 30 is axially translated about the axis 11, the pockets 44 align with the openings 28.

Forward leaning cross-section shaped channels 26 may be an effective tip treatment that recirculate air locally at the fan blade leading edge tip. The vanes 22 may be leaned tangentially as well as leaned forward. The concept may include skewed tangentially openings 28. This might make the slots/openings aligned to the blade angle instead of purely axial at the opening.

Incorporation of a movable closure 32 with around 50% openness may permits either tip treatment to be closed off from flow path, reducing efficiency debit for such when the stall margin is not need. This may provide three potential modes: 1) no treatment (closed mode), 2) first set of pockets 42, and 3) second set of pockets 44, all in one system/configuration.

The movable closure 32 may be directly on flow path, or just between it and the radial openings to control the activation or elimination of tip treatment benefit. It may be cleanest to have this directly on the inner surface 21.

In some embodiments, the movable member 30 has shallow pockets and deep pockets to be on the flanges 48. The movable member 30 is configured to slide axially over the radial wall opening. This may improve sector control and tuneability. The same may be done for the inner most openings, with local pockets being opened or particular sectors.

The openings may be actuated individually, as well as the axial slot vs. forward leaning cross-sectional shape potentially. There may be aeromechanical benefits to having sectors interrupted and potentially only some openings may need to have options to open/close or change tip treatment type (lower cost, weight, complexity to limit number of actuators).

The control unit 34 is configured to use sensor inputs from a sensor 66 to control operation of the movable member 30. The sensor 66 may include one of or a combination of a static wall pressure sensor, an altitude sensor, sensors configured to detect twisting of the fan blades 14, sensors configured to detect the tip timing of the fan blades 14, sensors configured to measure a rotational speed of the fan blades 14, a dynamic pressure transducer sensor. The combination of some sensors may provide data to engage mitigation of the effects of distortion, while other sensors may detect the maneuvers or mission phase.

For example, altitude and fan speed may provide data to engage mitigation, while also providing maneuver detection or regime/mission phase framing of control logic. Additionally, static wall pressure, dynamic pressure transducers, blade tip timing, blade untwist as well as fan speed and altitude may be used in distortion/effect detection for the control logic.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A fan case assembly adapted for use with a gas turbine engine, the fan case assembly comprising:
   a case that extends circumferentially at least partway about an axis to define an outer boundary of a gas path of the gas turbine engine, the case formed to define a channel that extends circumferentially at least partway about the axis,
   a plurality of vanes arranged in the channel and spaced apart circumferentially about the axis to define a plurality of openings open to the gas path of the gas turbine engine, and
   an inlet distortion mitigation system including a movable member mounted for movement relative to the case and a control unit, the movable member configured to axially translate relative to the case to move between a first slot position in which the movable member cooperates with the plurality of vanes to define a first set of slots having a first slot depth and a second slot position in which the movable member cooperates with the plurality of vanes to define a second set of slots having a second slot depth that is greater than the first slot depth, and the control unit configured to move the movable member between the first slot position and the second slot position in response to preselected operating conditions to minimize negative effects pressure and swirl distortions in the gas turbine engine to improve stall margin.

2. The fan case assembly of claim 1, wherein the movable member is shaped to define a first set of pockets that extend radially to a first pocket depth and the first set of pockets align with the plurality of openings to define the first set of slots when the movable member is in the first slot position.

3. The fan case assembly of claim 2, wherein the movable member is shaped to define a second set of pockets spaced apart axially from the first set of pockets that extend radially to a second pocket depth and the second set of pockets align with the plurality of openings to define the second set of slots when the movable member is in the second slot position, wherein the second pocket depth of the second set of pockets is greater than the first pocket depth of the first set of pockets.

4. The fan case assembly of claim 3, wherein the fan closure includes a band that extends circumferentially at least partway about the axis and a plurality of flanges spaced apart circumferentially about the axis that each extend axially from the band between adjacent vanes included in the plurality of vanes, wherein each flange of the plurality of flanges includes a first pocket from the first set of pockets and a second pocket from the second set of pockets spaced apart axially from the first pocket.

5. The fan case assembly of claim 3, wherein the inlet distortion mitigation system further includes a movable closure mounted for movement relative to the case and configured to axially translate relative to the case to move between a closed position in which the movable closure covers the plurality of openings to block fluid communication between the gas path and one of the first set of pockets and the second set of pockets and an open position in which the movable closure is spaced apart from the plurality of openings to allow fluid communication between the gas path and the one of the first set of pockets and the second set of pockets, and wherein the control unit is configured to move the movable closure between the closed position and the open position in response to the preselected operating conditions.

6. The fan case assembly of claim 1, wherein the inlet distortion mitigation system further includes a movable closure mounted for movement relative to the case and configured to axially translate relative to the case to move between a closed position in which the movable closure covers the plurality of openings to block fluid communication between the gas path and one of the first set of slots and the second set of slots and an open position in which the movable closure is spaced apart from the plurality of openings to allow fluid communication between the gas path and the one of the first set of slots and the second set of slots, and wherein the control unit is configured to move the movable closure between the closed position and the open position in response to the preselected operating conditions.

7. The fan case assembly of claim 1, wherein the control unit includes at least one actuator coupled to the movable member and configured to drive axial translation of the movable member, a controller coupled to the at least one actuator and configured to direct the at least one actuator to axially translate the movable member to the first slot position when the gas turbine engine is in a cruise condition included in the preselected operating conditions.

8. The fan case assembly of claim 7, wherein the control unit further includes a memory coupled to the controller, the memory including a plurality of preprogrammed aircraft maneuvers that each correspond to one of the first slot position and the second slot position, and the controller is configured to detect a preprogrammed aircraft maneuver included in the plurality of preprogrammed aircraft maneuvers on the memory and direct the at least one actuator to move the movable member to a corresponding position in response to detecting the preprogrammed aircraft maneuver.

9. The fan case assembly of claim 8, wherein the control unit further includes at least one sensor coupled to the controller and configured to measure one of pressure, air speed, altitude, blade tip timing, blade rotational speed, attitude, and acceleration, and wherein the controller is configured to receive a measurement from the at least one sensor and direct the at least one actuator to move the movable member to a corresponding position in response to the measurement of the at least one sensor.

10. The fan case assembly of claim 7, wherein the control unit further includes at least one sensor coupled to the controller and configured to measure one of pressure, air speed, altitude, blade tip timing, blade rotational speed, attitude, and acceleration, and wherein the controller is configured to receive a measurement from the at least one sensor and direct the at least one actuator to move the movable member to a corresponding position in response to the measurement of the at least one sensor.

11. A gas turbine engine comprising:
a fan including a fan rotor configured to axially translate about an axis of the gas turbine engine and a plurality of fan blades coupled to the fan rotor for axial translation therewith,
a fan case assembly that extends circumferentially around the plurality of fan blades radially outward of the plurality of the fan blades, the fan case assembly comprising:
a case that extends circumferentially at least partway about an axis to define an outer boundary of a gas path of the gas turbine engine, the case formed to define a channel that extends circumferentially at least partway about the axis,
a plurality of vanes arranged in the channel and spaced apart circumferentially about the axis to define a plurality of openings open to the gas path of the gas turbine engine, and
an inlet distortion mitigation system including a movable member mounted for movement relative to the case and a control unit, the movable member configured to axially translate relative to the case to move between a first slot position in which the movable member cooperates with the plurality of vanes to define a first set of slots having a first slot depth and a second slot position in which the movable member cooperates with the plurality of vanes to define a second set of slots having a second slot depth that is greater than the first slot depth, and the control unit configured to move the movable member between the first slot position and the second slot position in response to preselected operating conditions to minimize negative effects pressure and swirl distortions in the gas turbine engine to improve stall margin.

12. The gas turbine engine of claim 11, wherein the movable member is shaped to define a first set of pockets that extend radially to a first pocket depth and the first set of pockets align with the plurality of openings to define the first set of slots when the movable member is in the first slot position.

13. The gas turbine engine of claim 12, wherein the movable member is shaped to define a second set of pockets spaced apart axially from the first set of pockets that extend radially to a second pocket depth and the second set of pockets align with the plurality of openings to define the second set of slots when the movable member is in the second slot position, wherein the second pocket depth of the second set of pockets is greater than the first pocket depth of the first set of pockets.

14. The gas turbine engine of claim 11, wherein the movable closure includes a band that extends circumferentially at least partway about the axis and a plurality of flanges spaced apart circumferentially about the axis that each extend axially from the band between adjacent vanes included in the plurality of vanes, wherein each flange of the plurality of flanges includes a first pocket that extends radially to a first pocket depth and a second pocket that spaced apart axially from the first pocket that extends radially to a second pocket depth that is greater than the first pocket depth, and wherein the first pocket is configured to align with a first opening of the plurality of openings to define a first slot of the first set of slots when the movable member is in the first slot position and the second pocket is configured to align with the first opening of the plurality of openings to define a second slot of the second set of slots when the movable member is in the second slot position.

15. The gas turbine engine of claim 11, wherein the inlet distortion mitigation system further includes a movable closure mounted for movement relative to the case and configured to axially translate relative to the case to move between a closed position in which the movable closure covers the plurality of openings to block fluid communication between the gas path and one of the first set of slots and the second set of slots and an open position in which the movable closure is spaced apart from the plurality of openings to allow fluid communication between the gas path and the one of the first set of slots and the second set of slots, and wherein the control unit is configured to move the movable closure between the closed position and the open position in response to the preselected operating conditions.

16. The gas turbine engine of claim 11, wherein the control unit includes at least one actuator coupled to the movable member and configured to drive axial translation of the movable member, a controller coupled to the at least one actuator and configured to direct the at least one actuator to axially translate the movable member to the first slot position when the gas turbine engine is in a cruise condition included in the preselected operating conditions.

17. The gas turbine engine of claim 16, wherein the control unit further includes a memory coupled to the controller, the memory including a plurality of preprogrammed aircraft maneuvers that each correspond to one of the first slot position and the second slot position, and the controller is configured to detect a preprogrammed aircraft maneuver included in the plurality of preprogrammed aircraft maneuvers on the memory and direct the at least one actuator to move the movable member to a corresponding position in response to detecting the preprogrammed aircraft maneuver.

18. The gas turbine engine of claim 16, wherein the control unit further includes at least one sensor coupled to the controller and configured to measure one of pressure, air speed, altitude, blade tip timing, blade rotational speed, attitude, and acceleration, and wherein the controller is configured to receive a measurement from the at least one sensor and direct the at least one actuator to move the movable member to a corresponding position in response to the measurement of the at least one sensor.

19. A method comprising:
providing a fan case assembly adapted for use with a gas turbine engine, the fan case assembly including a case that extends circumferentially at least partway about an axis of the gas turbine engine and is formed to define a channel that extends circumferentially at least partway about the axis, a plurality of vanes arranged in the channel and spaced apart circumferentially about the axis to define a plurality of inlet openings open to a gas path of the gas turbine engine, and an inlet distortion mitigation system including a movable member mounted for axial translation relative to the case, locating the movable member in a first slot position in which the movable member cooperates with the plurality of vanes to define a first set of slots having a first slot depth, translating the movable member axially from the first slot position to a second slot position in which the movable member cooperates with the plurality of vanes to define a second set of slots having a second slot depth that is greater than the first slot depth in response to one preselected operating condition included in a plurality of preselected operating conditions.

20. The method of claim 19, wherein the inlet distortion mitigation system further includes a movable closure mounted for axial translation relative to the case, and wherein the method further comprises:

locating the movable closure in a closed position in which the movable closure covers the plurality of openings to block fluid communication between the gas path and one of the first set of slots and the second set of slots, and translating the movable closure from the closed position to an open position in which the movable closure is spaced apart from the plurality of openings to allow fluid communication between the gas path and the one of the first set of slots and the second set of slots.

* * * * *